H. J. DOUGHTY.
VULCANIZING APPARATUS.
APPLICATION FILED SEPT. 24, 1913.
1,260,990.
Patented Mar. 26, 1918.
2 SHEETS—SHEET 2.
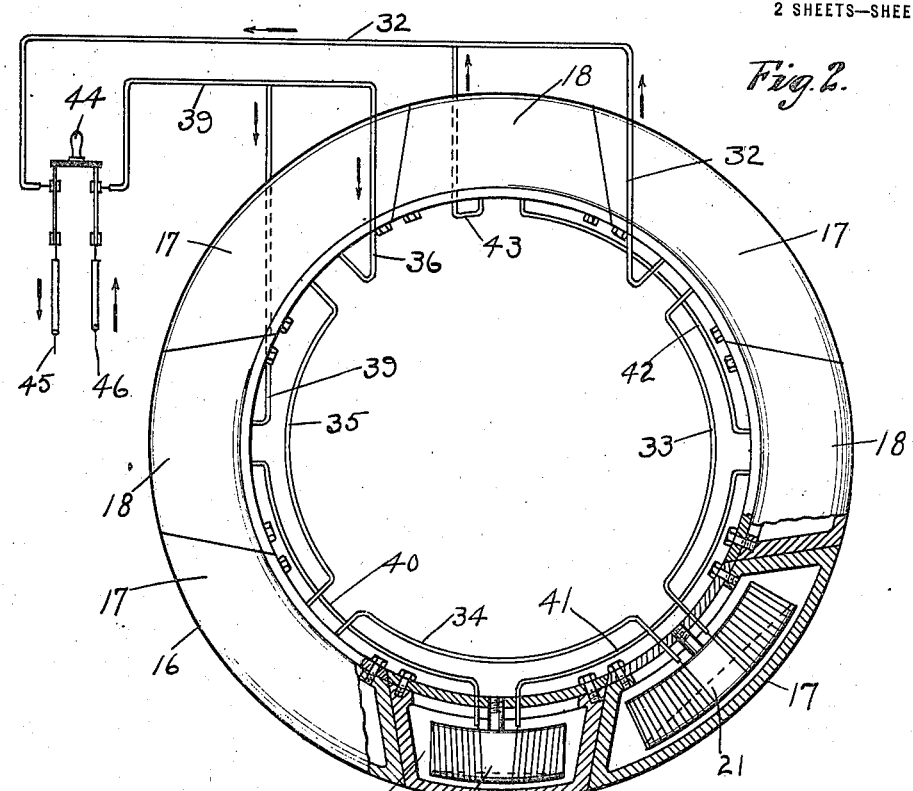
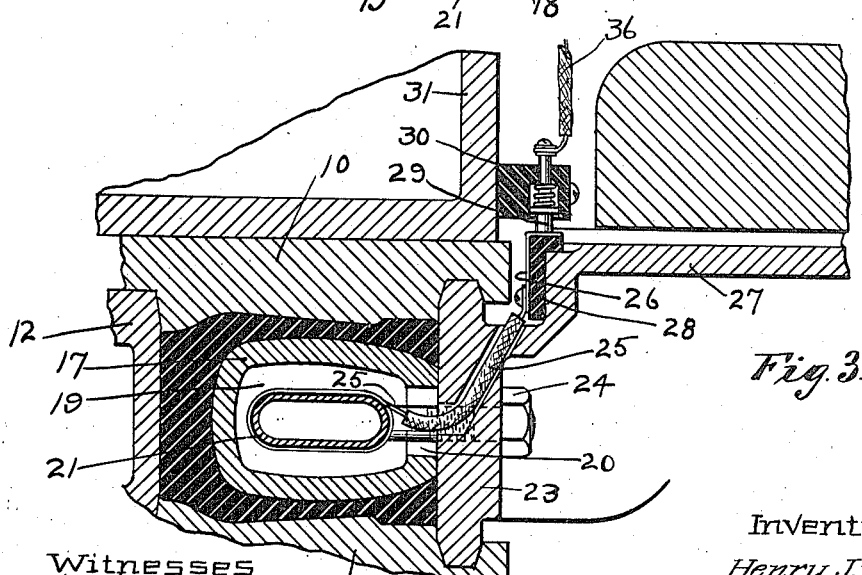
Witnesses
W. W. Bardsley
E. J. Ogden
Inventor
Henry J. Doughty.
By Howard E. Barlow
Attorney.

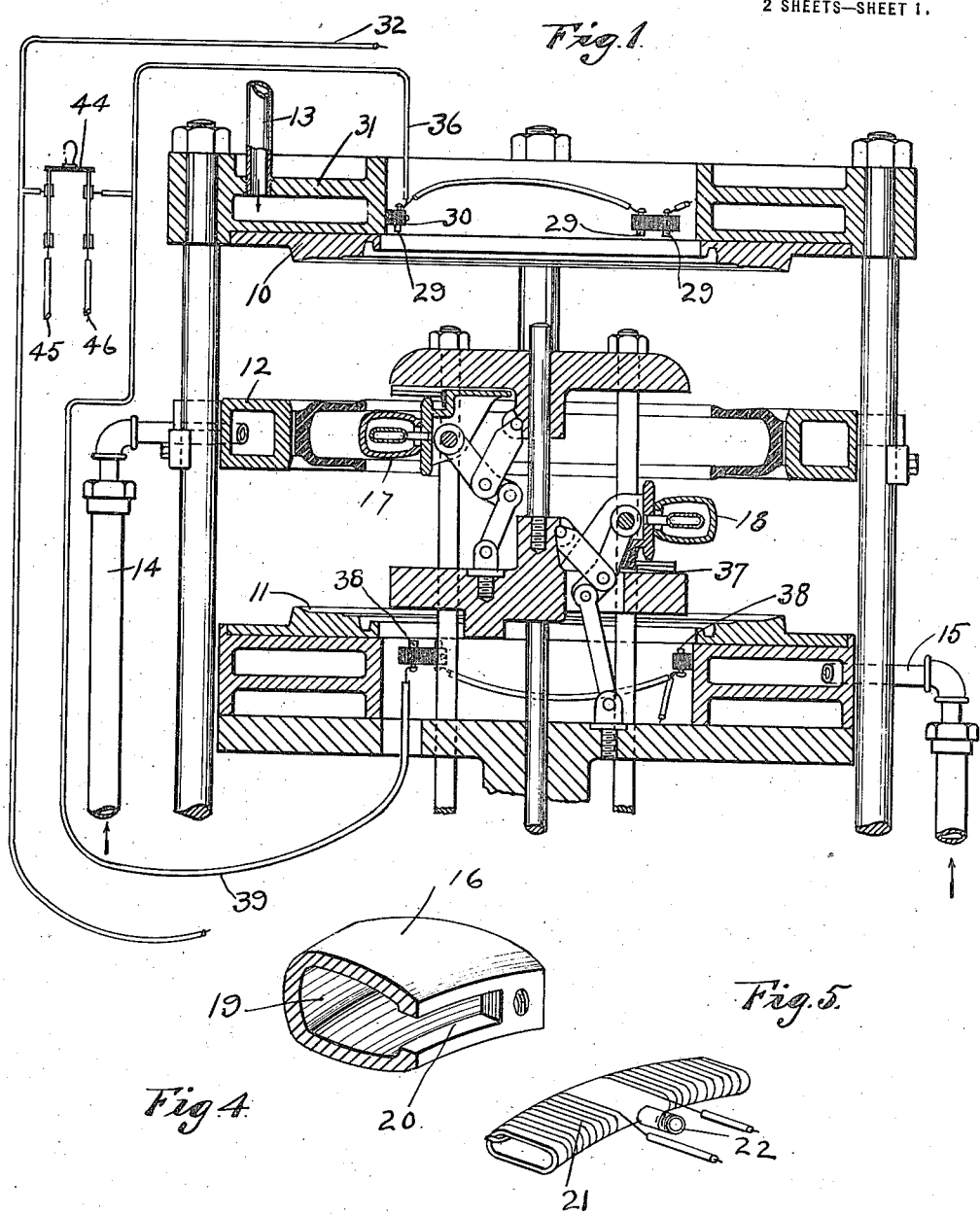

UNITED STATES PATENT OFFICE.

HENRY J. DOUGHTY, OF EDGEWOOD, RHODE ISLAND, ASSIGNOR TO DOUGHTY TIRE COMPANY, OF PORTLAND, MAINE, A CORPORATION OF MAINE.

VULCANIZING APPARATUS.

1,260,990.  Specification of Letters Patent.  Patented Mar. 26, 1918.

Application filed September 24, 1913. Serial No. 791,666.

*To all whom it may concern:*

Be it known that I, HENRY J. DOUGHTY, a citizen of the United States, and resident of Edgewood, in the county of Providence and State of Rhode Island, have invented certain new and useful Improvements in Vulcanizing Apparatus, of which the following is a specification.

This invention relates to vulcanizing apparatus, of the class more particularly designed for vulcanizing the casings for automobile tires and the like, and has for its object to provide in such an apparatus a separable mold whose sections are heated by any suitable means but preferably by steam, said mold being provided with a core formed in segments, such by way of example as is illustrated and described in my co-pending application Serial Number 739,233, and each individual segment being heated by electrical means.

In the specific form of the invention illustrated each segment is hollow and in this hollow chamber an electrically heating element, such as a coil or the like, is inserted, means being provided whereby the first movement in separating the parts of the mold and core at once breaks the electrical connections and automatically shuts off the current to each coil, and the last movement in closing the mold automatically makes the connection to complete the circuit and causes the coil to heat the core.

It is found in practice that by the employment of my improved core heating device on my machine, that approximately seventy-five per cent. of the time necessary for vulcanizing a tire is saved over the operation of the machine whose core is not heated, and also by this method of heating a better quality of tire is obtained as the vulcanizing effect is more uniform.

With these and other objects in view, the invention consists of certain novel features of construction, as will be more fully described and particularly pointed out in the appended claims.

Of the accompanying drawings:

Figure 1— is a sectional elevation showing a portion of the machine to which my improved heating apparatus is attached, the view showing the mold ring in its extreme open position with both sets of segments drawn inward and the second set withdrawn to a lower plane than that of the other, and a tire casing is shown in position ready to be acted upon.

Fig. 2— is a plan view showing the annular core as divided into segments with the mechanism for moving said segments removed, two of said segments being shown in section with an independent electrical heating coil in each, also showing the wire connections to the other segments.

Fig. 3— is an enlarged view showing a portion of the different mold sections and one of the core sections in position within a tire and illustrating the spring contact for completing the electrical connection to the core when the mold is brought to closed position.

Fig. 4— is a perspective view illustrating a portion of one of the core segments in section and showing the chamber formed therein and the slot in the inner edge for receiving the heating coil therethrough.

Fig. 5— illustrates one form of heating coil that is inserted into the different core segments.

Referring to the drawings, 10 designates the upper mold section, 11 the lower mold section, and 12 the intermediate section, said sections being shown as heated by steam through the pipes 13, 14 and 15 respectively. Coöperating with these mold sections is the core portion 16. This core, as illustrated in Fig. 2, is divided into a plurality of alternate large and small segments 17 and 18, respectively, all of said segments being adapted to be moved radially inward, the small segments moving first and then being dropped to a plane lower than that of the radial movement to permit the larger segment to move inward a distance sufficient to receive the tire casing. The mechanism for accomplishing such operation is fully illustrated and described in my above-mentioned co-pending application.

Each of these core segments are preferably made hollow as at 19 their inner surface being slotted as at 20, see Fig. 4, through which the heating coil presently described may be passed into said chambered portion.

This heating coil or unit 21 may be formed in any convenient way and of any convenient shape, but is preferably made in the form illustrated in Fig. 5. This heating unit is independent and separate or separable from the core segment, not only can the same heating unit be used for different sized segments such as are required in vulcanizing successive tires of different shapes and sizes, but furthermore the heating unit is separately connected to the segment plate or carrier, as is shown, and the core segment can be replaced by another without even disturbing the heating unit on its carrier. This heating unit is adapted to be passed through the slot 20 of its individual segment into the chambered portion thereof, each coil being provided with a laterally extending threaded stem 22 which passes through and is secured to the inner segmental plate 23 by means of the nut 24.

One of these coils is provided for each of the segments and is made of a size to be passed through the opening thereinto. The electrical connection to the coils in the large segments are best illustrated in Fig. 3. The wire 25 extends outward from the coil winding through the plate 23 and upward to the contact plate 26 located on the carriage portion 27 and insulated therefrom by the block 28. The other connecting member is a spring pressed pin 29 supported in the insulating block 30 on the fixed steam chamber 31, whereby when these large segments are moved out into operating position and the mold sections closed the contact is automatically made and the circuit completed through the wires 32, 33, 34, 35 and 36 to cause the current to pass through all of said cores simultaneously to heat them. The other and smaller set of core segments 18, which are moved first radially inward and then downward to a lower plane, are provided with a similar wire connection each having a contact plate 37 which when the core is moved outward into position and the mold closed will contact with the spring pressed pins 38 and complete the circuit through the wires 39, 40, 41, 42 and 43 through these segments, and both sets of wires are connected to the usual switch 44 through which the current is supplied from any convenient source through the feed wires 45 and 46.

The operation of my improved heating device may be more fully described as follows:

When it is desired to insert a tire into the mold the parts are separated into the position illustrated in Fig. 1 by suitable means, not shown, which separating action breaks the electrical connection and the current to the coils in the different segments is shut off. When the tire casing is positioned and ready to be acted upon and vulcanized by this apparatus, the parts of the mold are closed together around the tire, the different core segments are brought up into line with each other and carried radially outward to fit into and exert a heavy pressure on the inner portion of the wire. Steam is applied through the pipes 13, 14 and 15 to the different mold sections for applying the necessary vulcanizing temperature to the outside of the tire and as the parts are brought into operative position an electrical connection is completed through the wires 32 and 39 thereby providing heat on the inside of the tire as well as on the outside, thus greatly reducing the time necessary for vulcanizing a tire over the operation of a machine whose core is not heated. The application of heat to the inside of the tire also produces much better results as the vulcanizing effect is more uniform and a better quality of tire is obtained.

Then again, in starting the cold machine in the morning when no heat is applied to the core portion, a good part of an hour is wasted before this core portion can be brought up to the required vulcanizing heat.

I claim:

1. A tire vulcanizing apparatus comprising a mold formed of separable sections, a core therefor constructed of a plurality of independent separable segments, and independently supported heating devices extending into the respective segments for heating each segment independently of the remaining segments.

2. A tire vulcanizing apparatus comprising a mold formed of separable sections, a core therefor constructed of a plurality of independent radially movable segments, segmental plates supporting said core segments, and means carried by said segmental plates for heating each segment independently of the remaining segments.

3. A tire vulcanizing apparatus comprising a separable mold, means for heating the mold sections, a mold core constructed of a plurality of separable segments and a removable electrical heating element for each segment.

4. A tire vulcanizing apparatus comprising a separable mold, means for heating the mold sections, a mold core constructed of a plurality of separable segments and a removable electrical heating element for each segment contained within the hollow core but out of contact with the walls thereof.

5. A tire vulcanizing apparatus comprising a mold formed of separable sections, a mold core constructed of a plurality of separably arranged hollow segments, and a plurality of independently supported electrical heating elements inclosed within the respective segments.

6. A tire vulcanizing apparatus comprising a separable mold, means for heating the mold sections, a mold core constructed of a plurality of hollow segments, and a removable electrical coil within each segment for heating them independently.

7. A tire vulcanizing apparatus comprising a separable mold, means for heating the mold sections with steam, a mold core constructed of a plurality of separable segments each having a chambered portion, and an independent removable electric heating element within the chamber of each segment.

8. A tire vulcanizing apparatus comprising a separable mold, means for heating the outer sections of said mold by steam, a radially movable segmental core for said mold, an electrical heating element for each segment, and a carrier for said heating element for removably supporting them in said core.

9. A tire vulcanizing apparatus comprising a separable mold, means for heating the exterior sections of said mold by steam, a segmental core for said mold, each segment being provided with an independent removable electrical heating element.

10. A tire vulcanizing apparatus comprising a separable mold, means for heating the sections of said mold, a segmental core for said mold, a carrier for said core, and an independent electrical heating element secured to said carrier separately from said core whereby the latter may be replaced by another core without disturbing said heating element.

11. A tire vulcanizing apparatus comprising a separable mold, means for heating the sections of said mold, a plurality of radially movable segmental cores for said mold, mechanism for moving the same and a separate and independent electrical heating element removably mounted in each segment.

12. A tire vulcanizing apparatus comprising a separable mold, means for heating each section of said mold with steam, a mold core constructed of a plurality of hollow segments each having a chambered portion and an independent electric heating element within the chamber of each segment, and means for completing an electrical circuit through said coils as the segments are moved to operative position.

13. A tire vulcanizing apparatus comprising a separable mold, means for heating the sections of said mold by steam, a segmental core for said mold, each segment being provided with an independent detachable electrical heating element, and means for completing an electrical circuit through said coils as the segments are moved to operative position.

14. A tire vulcanizing apparatus comprising a mold, means for heating the same, a plurality of segmental cores for said mold each being provided with electrical heating means, and means for automatically controlling the electrical circuit of said heating means through the movement of said cores.

15. A tire vulcanizing apparatus comprising a separable mold, means for heating the sections of said mold by steam, a segmental core for said mold, each segment being hollow and provided with an independent detachable electrical heating element within said hollow portion, and means for automatically completing an electrical circuit through said coils as the segments are moved to operative position.

16. A tire vulcanizing apparatus comprising a separable mold, means for heating the sections of said mold by steam, a segmental core for said mold, each segment being hollow and provided with an independent electrical heating element within said hollow portion, and means controlled by movements of the segments to and from operative position for automatically making and breaking the electrical circuit through said coils.

17. A tire vulcanizing apparatus comprising a separable mold, means for heating the sections of said mold by steam, a segmental core for said mold, each segment being provided with an independent electrical heating element, and means controlled by movements of the segments to and from operative position for making and breaking the electrical circuit through said coils.

18. A tire vulcanizing machine comprising separable mold sections, means for heating each mold section, means for separating said sections, a mold core constructed of a plurality of hollow segments, an electrical heating element in each segment, means for moving said segments radially, and contacts carried by the sections for completing the electrical circuit through said coils when all the different parts have returned to operative position.

19. A tire vulcanizing machine comprising separable mold sections, means for heating the mold sections, means for separating said sections, a mold core constructed of a plurality of hollow segments, an electrical heating coil within each segment, means for moving said segments radially, and means carried by the different mold sections adapted to coöperate with means on said segments for completing the electrical circuit through said coils when all the different parts have returned to operative position.

In testimony whereof I affix my signature in presence of two witnesses.

HENRY J. DOUGHTY.

Witnesses:
HOWARD E. BARLOW,
E. I. OGDEN.